United States Patent
Allan et al.

(10) Patent No.: US 6,844,297 B2
(45) Date of Patent: Jan. 18, 2005

(54) FRACTURING METHOD USING AQUEOUS OR ACID BASED FLUIDS

(75) Inventors: Travis L. Allan, Calgary (CA); Junad Amin, Calgary (CA); Alan K. Olson, Strathmore (CA); Ronald G. Pierce, Calgary (CA)

(73) Assignees: Calfrac Well Services Ltd., Calgary (CA); Chemergy Ltd., Calgary (CA)

( * ) Notice: Subject to any disclaimer, the term of this patent is extended or adjusted under 35 U.S.C. 154(b) by 0 days.

(21) Appl. No.: 09/924,115

(22) Filed: Aug. 8, 2001

(65) Prior Publication Data

US 2002/0039972 A1 Apr. 4, 2002

(30) Foreign Application Priority Data

Aug. 8, 2000 (CA) .............................................. 2315544

(51) Int. Cl.[7] .............................................. E21B 43/26
(52) U.S. Cl. ...................... 507/244; 507/202; 507/240; 507/922; 507/923; 166/308
(58) Field of Search ................ 507/202, 240, 507/244, 922, 923; 166/308

(56) References Cited

U.S. PATENT DOCUMENTS

| | | | | |
|---|---|---|---|---|
| 5,258,137 A | * | 11/1993 | Bonekamp et al. ......... | 507/922 |
| 5,591,701 A | * | 1/1997 | Thomas ...................... | 507/244 |
| 5,964,295 A | | 10/1999 | Brown et al. | |
| 6,258,859 B1 | * | 7/2001 | Dahayanake ................ | 507/922 |
| 6,399,546 B1 | * | 6/2002 | Chang et al. ............... | 507/240 |
| 6,482,866 B1 | * | 11/2002 | Dahayanake et al. ....... | 166/308 |
| 6,703,352 B2 | * | 3/2004 | Dahayanake et al. ....... | 507/241 |
| 2002/0033260 A1 | * | 3/2002 | Lungwitz ................... | 166/308 |
| 2003/0168217 A1 | * | 9/2003 | Zhang et al. ............... | 166/308 |
| 2004/0045710 A1 | * | 3/2004 | Fu et al. .................... | 166/282 |

FOREIGN PATENT DOCUMENTS

CA  1298697  10/1987

OTHER PUBLICATIONS

Nehmer, W.L., "Viscoelastic Gravel–Pack Carrier Fluid", Feb. 8–9, 1988, Society of Petroluem Engineers, pp. 217–226.

* cited by examiner

Primary Examiner—Philip C. Tucker
(74) Attorney, Agent, or Firm—Hoffman, Wasson & Gitler

(57) ABSTRACT

An improved method and fracturing fluid for hydraulic fracturing of a subterranean formation, the fracturing fluid comprising a surfactant, a water soluble or dispersible anionic organic salt, an acid and a low molecular weight organic solvent.

10 Claims, 1 Drawing Sheet

FRACTURING METHOD USING AQUEOUS OR ACID BASED FLUIDS

BACKGROUND OF THE INVENTION

The present invention relates to the field of fracturing fluids, in particular, surfactant based fracturing fluids.

Field of the Invention

A fracturing fluid is a fluid that is pumped into a hydrocarbon-bearing reservoir in a geological formation under high pressure to open fractures in the formation, thereby to facilitate the flow of hydrocarbons from the formation. Fracturing fluids are preferably viscous, so as to be able to carry proppants into the fractures that are forced open in the formation.

Conventional fracturing fluids contain high molecular weight polysaccharides based polymers, as gelling agents. These polymers are associated with build-up of filter cake on the fracture face. If the filter cake is not completely removed, it will impede flow of reservoir fluid and hence reduce the effectiveness of the fracture. Control and limiting of residual filter cake becomes extremely important when dealing with problematic formations. Alternative to the conventional polymeric system is the novel development of the present invention.

The present invention is a non-polymeric visco-elastic system. The system is based on surfactant chemistry. Although surfactant based systems have been employed in gravel packing operations since the early 1980s (SPE 17168), further development and refinement of surfactant chemistry has yielded surfactant based fracturing fluids. Some of these techniques are discussed and revealed in Canadian Patent No. 1,298,697 and U.S. Pat. No. 5,964,295.

The advantage of a surfactant based fracturing fluid over a polymeric gel based fluid is that micelle formation in surfactant fluids is virtually instantaneous, but does not alter the actual chemical composition of the fluid. That is, once a critical concentration of surfactant molecules is reached, they will aggregate as micelles, thereby increasing the viscosity of the fluid, but without changing the chemical composition. Therefore, no chemical initiator is required, and viscosity increase occurs uniformly throughout the fluid.

The key to the present invention therefore is the novel use of amphoteric glycinate surfactant, as an additive. In acidic conditions, the glycinate exhibits cationic properties. When the glycinate is combined in proper ratio with anionic salt such as Sodium Xylene Sulfonate in a neutral to acidic environment of an aqueous stimulation fluid (water or acid) it is believed to form highly structured three dimensional micelles. The interference/interaction of the micelles imparts the desired viscoelastic properties to the stimulation fluid. The required cationic activity of the glycinate is ensured by utilization of an organic acid in the formulation of the additive. The purpose of a low molecular alcohol used in the system is to serve as a dispersability agent for making the system field friendly.

The viscoelastic properties imparted to stimulation fluid are controlled by three mechanisms;

1. By varying total additive added to the stimulation fluid (0.1–5.0% by volume).

2. By controlling the ratio between the organic/inorganic salt and the glycinate (0.15–0.6% of glycinate); and 3. By controlling or adjusting the pH of the fracturing fluid system.

Another novel use of amphoteric surfactant is the utilization of change in its ionic properties with pH to control the break mechanism of the gel. As the pH of the system is increased above 6.5 the ionic properties of the glycinate change from cationic to anionic. This change de-stabilizes the micellar structure, hence, resulting in the break of the gel, allowing for easy post frac cleanup. In the earlier technologies, to attain a break the system had to encounter formation fluids (oil and/or water) In order to de-stabilize the gel structure. Simple adjustment in pH did not break the gel in the earlier inventions. This limited the use of the system to those wells that contained oil or those that produced condensate. In the present invention the pH of the system can be increased easily by utilization of alkaline compounds such as carbonates, oxides, amines and etc.

As the temperature of the system increases the interaction between the ion weakens, resulting in decrease in stability of the micelles. The upper limit of the gel appears to be around 65° C. The upper temperature range may be further increased by utilization with alternative salts or using a surfactant with different length of the alkyl group, In a broad aspect, then, the present invention relates to a fracturing fluid comprising:

(i) a surfactant having the general formula

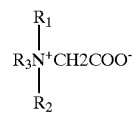

where $R_1$–$R_2$ are each an aliphatic group of C1–C4, branched or straight chained, saturated or unsaturated, R3 is a group of C12–C22, branched, straight chained or cyclic, saturated or unsaturated:

(ii) a water soluble or dispersible anionic organic salt;
(iii) an acid; and
(iv) a low molecular weight organic solvent.

BRIEF DESCRIPTION OF THE DRAWING

The attached drawing is a graph of viscosity % against pH.

It will be observed, then, that the present invention is a four component system, although the four components are typically combined into a single component prior to addition to the fluid being viscosified. The primary component, the surfactant, is preferably a dihydroxyethyl tallow glycinate having the structure:

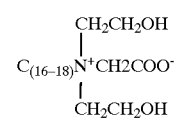

Figure 1:
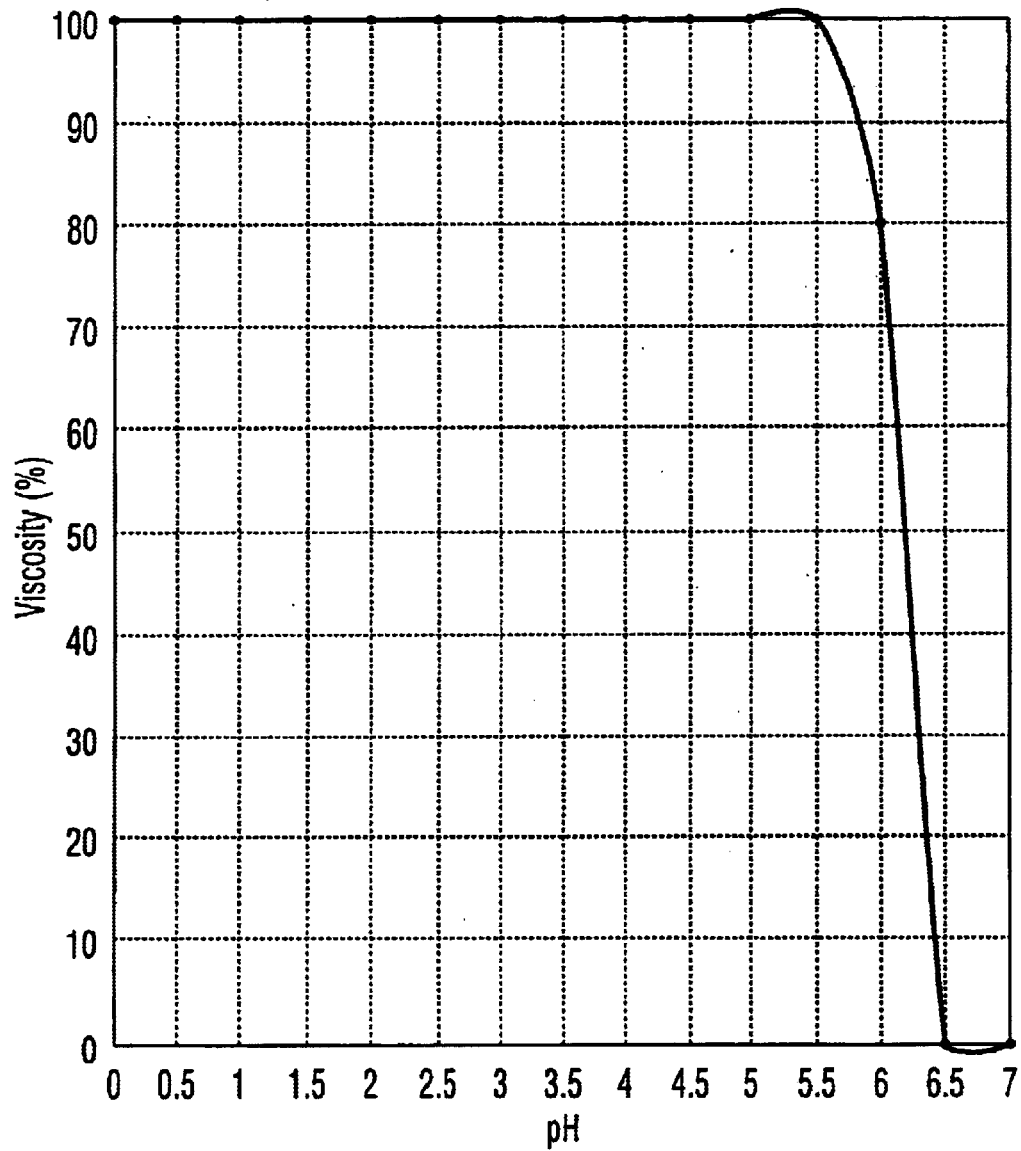

The second component, the salt is preferably sodium xylene sulfonate. However, other similar salts may be used, such as potassium, zinc, ammonium, magnesium (etc.) xylene or toluene sulfonate. In addition, other naphthalene backboned sulfonate salts may be used. Inorganic salts such as sodium chloride or potassium chloride (KCL) can also be used.

As to the acid component, any organic or mineral acid may be used to lower the pH below 6.5. Acids that have been found to be useful include formic acid, citric acid, hydrochloric acid, and so on. The preferred acid is acetic acid because it is universally available, low cost, and safe to handle.

The final component, the alcohol solvent is used to modify the viscosity of the solvent, usually water, by altering its polarity, which will result in reduced viscosity of the miscellar formations.

In an aqueous fluid, the surfactant composition of the present invention is added in a concentration of from about 0.1% wt to about 5.0% wt. The actual composition in a preferred composition will be, for example:

| | |
|---|---|
| Glycinate | 0.65 |
| Organic salt | 0.20 |
| Acid | 0.025 |
| Solvent | 0.125 |

Some variations, up to about 50% per component, are possible.

Unfoamed, the upper temperature limit of the present invention is about 65° C. However, formulation of the present invention is also compatible with $CO_2$, $N_2$ and $CO_2$, $N_2$, air and low molecular weight hydrocarbon gas foams, over a temperature range of 5° C.–80° C.

The addition of Nitrogen ($N_2$) or Carbon Dioxide ($CO_2$) as either a liquid or gas can dramatically improve the flow back characteristics of fracture fluids especially in under pressured reservoirs. Not only is the amount of fluid required for the job reduced, the hydrostatic head of the well bore fluid is lowered and the well can flow on its own. High pumping pressures will compress Nitrogen bubbles during placement of the stimulation treatment only to expand when pressures are bled off and the treatment is flowed back. The fluid contains 10–200 standard cubic meters of Nitrogen or Carbon Dioxide per cubic meter of fluid.

Liquid or gaseous $CO_2$ can also be used to act as the energizing phase, although it is pumped as a liquid and returns to surfaces as a gas. The thermodynamic properties of liquid/gaseous $CO_2$ make it a unique fluid for fracturing. The fluid is pumped at low temperatures of typically –5 to –25° C. and it remains as a critical fluid (single phase) while the fracture is created and the proppant placed. Liquid $CO_2$ that leaks off from the fracture quickly rises to reservoir temperature, increasing its specific volume and becoming more like a gas. When the pressure is dropped and the well is flowed the single phase fluid returns to surface as $CO_2$ vapor.

Treatment design for $N_2$ energized fluid systems typically utilizes $N_2$ pumped at ratios of 40–60 scm/m³, which means standard cubic meters of Nitrogen gas per cubic meter of fluid (water). This is normally sufficient to allow the well to flow unassisted with reservoir pressure gradients of 6 kPa/m or higher. For energized $CO_2$ systems, liquid $CO_2$ is added at equivalent ratios, once the conversion from liquid to gas is made (543 scm/m³). Combined down hole fracturing pump rates are approximately 3.5m³/min.

Foam Fracturing

When liquid $CO_2$ is used as the energizing medium, the resulting mixture is often referred to as an emulsion, since both phases are liquids. However, herein the term foam is used for describing both $N_2$ or Liquid or gaseous $CO_2$ foamed systems. A foam fracture treatment consists of nitrogen (typically 75%) dispersed as small bubbles throughout a continuous liquid phase. In traditional foams, the liquid phase contains surfactants and gellants to prevent coalescence and resulting phase separation. Foam quality ($N_2$ or Liquid $CO_2$) should range from 52–95% (ratio of gas volume to foam volume). Above 95% the mixture can be defined as a mist with the gas becoming the continuous phase. Below 52% there is no bubble to bubble interference and therefore a stable foam does not exist. Above 52% the gas concentration is high enough for the bubbles to interfere and deform, thereby imparting resistance to shear and increasing the viscosity of the fluid system.

Unlike conventional foams that utilize long-chained polymers to viscosify the external phase, the present invention, foamed, uses a combination of surfactants to impart viscosity to the water phase. The chemical structure that is formed produces a three-dimensional matrix of molecules that interfere with each other and raise the apparent viscosity of the base fluid system. Combined with either $N_2$ or Liquid $CO_2$, foam viscosities are generated as a function of foam quality and the fluid system develops all of the properties desired for a fracture fluid system. The use of surfactants also produces a fluid with strong foaming tendencies that aids the return of fluids from the reservoir when foamed with the producing hydrocarbon gas.

Field Trials

With depths ranging from 450–1600 m, trial stimulation treatments have focussed on Cretaceous sandstones that range in reservoir pressure from 2–7 kPa/m. Fracture fluid cleanup has been reported as superior to conventional foams utilizing polymer base gels. Some of the stimulated reservoirs include Glauconite, Dinosaur Park, Bad Heart, Viking, Belly River, Colony, Sunburst, Bluesky, Dunvegan, Mannville, and Bow Island. Long term production data is not available at this time, but comments from trial operations are very positive on fast clean-up and initial production. Also, these reservoirs represent trial stimulation work to date and do not suggest any limitations on the potential for usage on other gas-bearing reservoirs.

Typical Treatments

| JOB TYPE | LOCATION FRAC GRADIENT | FORMATION DEPTH | AVERAGE RATE AVE. PRESSURE | PROPPANT VOL. MAX CONC. |
|---|---|---|---|---|
| $N_2$ Energized | 69-22W5 | Bad Heart | 2.8 m³/min | 25 tonne |
| CWS 400 | 22 kPa/m | 625 m | 9.5 Mpa | 1070 kg/m² |
| $CO_2$ Energized | 17-24W4 | Ostracod | 2.8 m³/min | 10 tonne |
| CWS 400 | 18 kPa/m | 1668 m | 27.0 Mpa | 1012 kg/m³ |
| $N_2$ Foamed | 33-5W4 | Colony | 3.4 m³/min | 15 tonne |
| CWS 400 | 22 kPa/m | 858 m | 18.3 Mpa | 743 kg/m³ |
| $CO_2$ Foamed | 20-26W4 | Belly River | 4.2 m³/min | 5 tonne |
| CWS 400 | 17 kPa/m | 969 m | 12.0 Mpa | 560 kg/m³ |

Note: CWS 400 is the fluid of the present invention.

Post Fracture Flow Rate Comparison

| JOB TYPE | LOCATION | MEDICINE HAT FLOW RATE | L. MILK RIVER FLOW RATE | LI. MILK RIVER FLOW RATE |
|---|---|---|---|---|
| N₂ Energized Borate | 21-17W4 | 11,680 m³/day | 2,650 m³/day | 1.200 m³/day |
| N₂ energized CWS 400 | 21-17W4 | 10,860 m³/day | 4,610 m³/day | 2.700 m³/day |

Lab Test Data

The following examples are used to illustrate viscosifying properties of the fluid of the present invention.

EXAMPLE #1

Following additives were added to the water while stirring:

| | |
|---|---|
| Glycinate | 0.520 volume % |
| Sodium Xylene Sulfonate | 0.152 volume % |
| Glacial Acetic Acid | 0.040 volume % |
| Isopropyl Alcohol | 0.088 volume % |

Results

Upon completion of addition of the additives. Viscoelastic gel was observed to be present in the container. The rheological properties of the gel were measured using Brookfield LVT viscometer with spindle #1 and the guard leg attached.

| Speed (RPM) | Viscosity (cP) |
|---|---|
| 100 | 10.9 |
| 60 | 14.7 |
| 50 | 16.4 |
| 30 | 23.2 |
| 20 | 29.4 |
| 12 | 39.5 |

EXAMPLE #2

Following additives were added to the water while stirring.

| | |
|---|---|
| Glycinate | 1.30 volume % |
| Sodium Xylene Sulfonate | 0.32 volume % |
| Glacial Acetic Acid | 0.10 volume % |
| Isopropyl Alcohol | 0.22 volume % |

Results

Upon completion of addition of the additives. Viscoelastic gel was observed to be present in the container. The Theological properties of the gel were measured using Brookfield LVT viscometer with spindle #1 and the guard leg attached.

| Speed (RPM) | Viscosity (cP) |
|---|---|
| 60 | 71.7 |
| 50 | 83.5 |
| 30 | 127.4 |
| 20 | 178.8 |
| 12 | 267.0 |
| 6 | 414 |
| 3 | 532 |
| 1.5 | 592 |
| 0.6 | 670 |
| 0.3 | 740 |

Conclusion

The two examples clearly demonstrate viscosifying properties of surfactants. These viscosities are deemed sufficient for fracturing.

The novel surfactant based system of the present invention can not only be used for viscosifying water but also can be used for viscosifying mineral, organic and/or inorganic acids. The rheological properties imparted by the system will be dictated by type of acid and strength of acid being used. Typical acid used are HC1 (10–34%, Acetic Acid, Formic Acid, Sulfamic Acid, HC1/HF acid mixture etc.) Typically, viscosified acids are used in stimulation of: hydrocarbon bearing formation, water injection wells, and disposal wells to improve production or injectivity of the reservoir. Viscosified acids have an advantage over non-viscosified acid, as the reaction rate of the acid to the formation rock is proportional to viscosity of acid mixture. By retarding the acid reactivity through the gellation process, deeper acid penetration in more controlled fashion is accomplished. This typically creates better flow channels between reservoir and the well.

The viscosifying acid with surfactant alternative embodiments of the present invention has an additional advantage compared to the conventional polymer methods of viscosifying acid. That is, as the acid reaction proceeds with the formation, product from this reaction produce salts that act as a breaker to viscosified acid. This allows to cleanup-spent acid more easily.

It will also be understood by one skilled in the art that altering the ratio of additives in either embodiment of the present invention can control the rheological properties.

In order to lower the viscosity of the surfactant based fracturing fluid of the present invention, the pH of the fluid is raised by the addition of an alkaline substance such as magnesium oxide or sodium hydroxide. This effectively raises the critical micelle concentration of the fluid, resulting in disassociation of the micelles that have been formed. Accordingly, it will be understood that formation clean-up is quickly accomplished, without caking or clogging.

The embodiments of the invention in which an exclusive property or privilege is claimed are defined as follows:

1. A method of fracturing a subterranean formation comprising the steps of:

providing a visco-elastic surfactant based hydraulic fracturing fluid comprising:
(i) a surfactant having the general formula

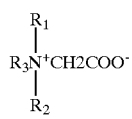

wherein $R_1$–$R_2$ are each an aliphatic group of C1–C4, branched or straight chained, saturated or unsaturated, R3 is a group of C12–C22, branched, straight chained or cyclic, saturated or unsaturated;

(ii) a water soluble or dispersible anionic organic or inorganic salt;

(iii) an acid; and (iv) a low molecular weight organic solvent, and;

pumping said fracturing fluid through a well bore and into a subterranean formation at a sufficient pressure to cause fracturing of said formation including the further step of lowering the viscosity of said fluid by raising the pH thereof.

2. A method as claimed in claim 1, wherein said pH is raised by the addition of an alkaline compound selected from the group consisting of carbonates, oxides, and amines.

3. A method as claimed in claim 1, wherein said ratio of said salt to said surfactant is in the range of 1:4 to 1:2.

4. A method as claimed in claim 3, wherein said salt is selected from the group consisting of potassium xylene sulfonate, sodium xylene sulfonate, ammonium xylene sulfonate, zinc xylene sulfonate, magnesium xylene sulfonate, sodium toluene sulfonate, potassium toluene sulfonate, zinc toluene sulfonate, ammonium toluene sulfonate, magnesium toluene sulfonate, NaCl and KCl.

5. A method as claimed in claim 3, wherein said acid is selected from the group consisting of formic acid, citric acid, hydrochloric acid and acetic acid.

6. A method as claimed in claim 3, wherein said organic solvent is a low molecular weight alcohol.

7. A method as claimed in claim 6, wherein said surfactant is present in a quantity of about 0.1% (wt) to about 5.0% (wt).

8. A method as claimed in claim 7, wherein said hydraulic fracturing fluid is in the form of a foam including about 52 to about 95% gas selected from the group consisting of $CO_2$, $N_2$, air and low molecular weight hydrocarbons.

9. A method as claimed in claim 7, wherein said hydraulic fracturing fluid contains 10–200 standard cubic meters of $N_2$ per cubic meter of fluid.

10. A method as claimed in claim 7, wherein said hydraulic fracturing fluid contains 10–200 standard cubic meters of gaseous $Co_2$ per cubic meter of fluid or the liquid equivalent.

* * * * *